(12) United States Patent
Detering et al.

(10) Patent No.: US 7,919,451 B2
(45) Date of Patent: Apr. 5, 2011

(54) USE OF CATIONIC POLYCONDENSATION PRODUCTS AS ADDITIVES FOR FIXING COLOURS AND/OR INHIBITING THE RUNNING OF COLOURS, FOR WASHING PRODUCTS AND WASHING AFTERTREATMENT PRODUCTS

(75) Inventors: Juergen Detering, Limburgerhof (DE); Lidcay Herrera Taboada, Ludwigshafen (DE); Christian Hubert Weidl, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 620 days.

(21) Appl. No.: 11/909,396

(22) PCT Filed: Mar. 21, 2006

(86) PCT No.: PCT/EP2006/060920

§ 371 (c)(1),
(2), (4) Date: Sep. 21, 2007

(87) PCT Pub. No.: WO2006/100246

PCT Pub. Date: Sep. 28, 2006

(65) Prior Publication Data

US 2009/0005286 A1    Jan. 1, 2009

(30) Foreign Application Priority Data

Mar. 22, 2005 (DE) .......................... 10 2005 013 780

(51) Int. Cl.
*C11D 3/37* (2006.01)
(52) U.S. Cl. ........ 510/475; 510/327; 510/350; 510/433; 510/499
(58) Field of Classification Search .................. 510/327, 510/350, 433, 475, 499
See application file for complete search history.

(56) References Cited

U.S. PATENT DOCUMENTS

| | | | | |
|---|---|---|---|---|
| 4,157,388 A | * | 6/1979 | Christiansen | 424/70.19 |
| 5,569,724 A | * | 10/1996 | Hendricks et al. | 525/432 |
| 2003/0078185 A1 | * | 4/2003 | Norenberg et al. | 510/475 |

FOREIGN PATENT DOCUMENTS

| | | | |
|---|---|---|---|
| DE | 2 309 099 | | 8/1973 |
| DE | 198 40 019 | | 3/2000 |
| EP | 0 665 255 | | 8/1995 |
| EP | 0 824 156 | | 2/1998 |
| EP | 1 236 793 | | 9/2002 |
| WO | 98 17762 | | 4/1998 |
| WO | 98 21301 | | 5/1998 |
| WO | 98 29529 | | 7/1998 |
| WO | WO 00/47705 | * | 8/2000 |
| WO | 01 74982 | | 10/2001 |
| WO | 2004 056888 | | 7/2004 |

* cited by examiner

*Primary Examiner* — Brian P Mruk
(74) *Attorney, Agent, or Firm* — Oblon, Spivak, McClelland, Maier & Neustadt, L.L.P.

(57) ABSTRACT

The invention relates to the use of cationic polycondensation products as additives for fixing colors and/or inhibiting the running of colors, for washing products and washing aftertreatment products. Said cationic polycondensation products can be produced by the condensation of (A1) non-cyclic amines obtained by the reaction of (A1 a) mono(N,N-dialkylaminoalkyl)amines with (A1 b) bifunctional compounds selected from the group containing urea, thiourea, dialkyl carbonates, aliphatic and aromatic dicarboxylic acids, and aliphatic and aromatic diisocyanates, in a molar ratio 1.2:1 to 2.1:1, or (A2) mixtures of non-cyclic amines (A1) and cyclic amines (A3) in a molar ratio 10:1 to 1:10 with (B) bifunctional compounds selected from the group containing alkylene dihalogenides, dihalogen alkyl ethers, halomethyl oxiranes, and bisepoxides, in a molar ratio (B) to (A1) or (B) to (A2) from 0.6:1 to 1.3:1.

13 Claims, No Drawings

USE OF CATIONIC POLYCONDENSATION PRODUCTS AS ADDITIVES FOR FIXING COLOURS AND/OR INHIBITING THE RUNNING OF COLOURS, FOR WASHING PRODUCTS AND WASHING AFTERTREATMENT PRODUCTS

The present invention relates to the use of cationic polycondensation products which are obtainable by condensation of
(A1) noncyclic amines prepared by reaction of
  (A1a) mono(N,N-dialkylaminoalkyl)amines
    with
  (A1b) bifunctional compounds selected from the group of urea, thiourea, dialkyl carbonates, aliphatic and aromatic dicarboxylic acids and aliphatic and aromatic diisocyanates,
    in a molar ratio from 1.2:1 to 2.1:1,
or
(A2) mixtures of noncyclic amines (A1) and cyclic amines (A3) in a molar ratio from 10:1 to 1:10
with
(B) bifunctional compounds selected from the group of the alkylene dihalides, dihaloalkyl ethers, halomethyloxiranes and bisepoxides
in a molar ratio of (B) to (A1) or (B) to (A2) of from 0.6:1 to 1.3:1
as a dye-fixing and/or dye transfer-inhibiting additive to laundry detergents and laundry aftertreatment compositions.

The invention also relates to laundry detergents and laundry aftertreatment compositions which comprise these cationic polycondensation products.

The invention further relates to novel cationic polycondensation products which are obtainable by condensation of
(A1) noncyclic amine prepared by reaction of
  (A1a) mono(N,N-dialkylaminoalkyl)amines
    with
  (A1b) bifunctional compounds selected from the group of urea, thiourea, dialkyl carbonates, aliphatic and aromatic dicarboxylic acids and aliphatic and aromatic diisocyanates,
    in a molar ratio from 1.2:1 to 2.1:1,
with
(B) bifunctional compounds selected from the group of the halomethyloxiranes and bisepoxides
in a molar ratio of (B) to (A1) of from 0.6:1 to 1.3:1,
and to novel cationic polycondensation products which are obtainable by condensation of
(A1) noncyclic amine prepared by reaction of
  (A1a) mono(N,N-dialkylaminoalkyl)amines
    with
  (A1b) bifunctional compounds selected from the group of the aliphatic and aromatic dicarboxylic acids and aliphatic and aromatic diisocyanates, in a molar ratio from 1.2:1 to 2.1:1,
with
(B) bifunctional compounds selected from the group of the alkylene dihalides, dihaloalkyl ethers, halomethyloxiranes and bisepoxides
in a molar ratio of (B) to (A1) of from 0.6:1 to 1.3:1.

Finally, the invention relates to novel cationic polycondensation products which are obtainable by condensation of
(A2) mixtures of
  (A1) noncyclic amine prepared by reaction of
    (A1a) mono(N,N-dialkylaminoalkyl)amines
      with
    (A1b) bifunctional compounds selected from the group of urea, thiourea, dialkyl carbonates, aliphatic and aromatic dicarboxylic acids and aliphatic and aromatic diisocyanates,
      in a molar ratio from 1.2:1 to 2.1:1,
    and
  (A3) cyclic amines
    in a molar ratio from 10:1 to 1:10
with
(B) bifunctional compounds selected from the group of the alkylene dihalides, dihaloalkyl ethers, halomethyloxiranes and bisepoxides
in a molar ratio (B) to (A2) of from 0.6:1 to 1.3:1.

The repeated washing of colored textiles leads frequently to the color becoming paler, as a result of which these textiles become unsightly. This effect is attributable principally to the lack of washfastness of the colored textiles. The dyes are only insufficiently anchored in the fabric and can therefore be washed out easily. In addition, the dyes detached from the colored textiles in the course of washing can be transferred to other fabrics, as a result of which these fabrics become gray. In order to prevent this dye graying, so-called color laundry detergents have been developed, which comprise polymeric dye transfer inhibitors.

As dye transfer-inhibiting and dye-fixing additives for laundry detergents and laundry aftertreatment compositions, WO-A-98/17762 discloses cationic polycondensation products which are obtained by condensation of piperazines and/or imidazoles with alkylene dihalides, halomethyloxiranes or bisepoxides, and may be quaternized.

WO-A-98/21301 describes, for this purpose, copolymers of vinylimidazole and vinylpyrrolidone, whose vinylimidazole units have been quaternized.

WO-A-04/56888 describes copolymers based on cationic monomers of the diallyl-dialkylammonium type and of hydrophobic nonionic monomers such as methyl methacrylate and ethoxylated nonylphenol acrylate as corresponding additives for cleaning products.

WO-A-98/29529 discloses textile laundry detergents which comprise, as cationic dye fixatives, polymeric quaternary ammonium compounds which do not give rise to any precipitates with anionic surfactants.

WO-A-01/74982 describes textile care compositions which comprise at least one cellulase and at least one dye-fixing polymer comprising imidazolidine units.

Cationic polymers which are obtained by condensation of the reaction products of dialkylaminoalkylamines and urea with alkylene dihalides are known from U.S. Pat. No. 4,157,388 as moisturizers and humectants in hair and fabric conditioners. DE-A-198 40 019 describes the use of such polymers as auxiliaries in electroplating technology.

The polymers used to date as dye transfer inhibitors and dye fixatives do not exhibit sufficient action in the case of many colored fabrics.

It was an object of the invention to provide polymers with which dye detachment and dye transfer in the course of washing can be effectively suppressed.

Accordingly, the use has been found of cationic polycondensation products which are obtainable by condensation of
(A1) noncyclic amine prepared by reaction of
  (A1a) mono(N,N-dialkylaminoalkyl)amines
    with
  (A1b) bifunctional compounds selected from the group of urea, thiourea, dialkyl carbonates, aliphatic and aromatic dicarboxylic acids and aliphatic and aromatic diisocyanates,
    in a molar ratio from 1.2:1 to 2.1:1, or
(A2) mixtures of noncyclic amines (A1) and cyclic amines (A3) in a molar ratio from 10:1 to 1:10
with
(B) bifunctional compounds selected from the group of the alkylene dihalides, dihaloalkyl ethers, halomethyloxiranes and bisepoxides
in a molar ratio of (B) to (A1) or (B) to (A2) of from 0.6:1 to 1.3:1,
as a dye-fixing and/or dye transfer-inhibiting additive to laundry detergents and laundry aftertreatment compositions.

At the same time, novel cationic polycondensation products have been found, which are obtainable by condensation of the noncyclic amines (A1) with halomethyloxiranes and/or bisepoxides as bifunctional compounds (B) in a molar ratio of (B) to (A1) of from 0.6:1 to 1.3:1.

Additionally found have been novel cationic polycondensation products which are obtainable by condensation of noncyclic amines (A1) based on reaction products of dialkylaminoalkylamines (A1a) and dicarboxylic acids and/or diisocyanates as bifunctional compounds (A1b) with the bifunctional compounds (B) in a molar ratio of (B) to (A1) of from 0.6:1 to 1.3:1.

Finally found have been cationic polycondensation products which are obtainable by condensation of (A2) mixtures of the noncyclic amines (A1) with cyclic amines (A3) in a molar ratio of from 10:1 to 1:10 with the bifunctional compounds (B) in a molar ratio of (B) to (A2) of from 0.6:1 to 1.3:1.

Both in the inventive cationic polycondensation products and the cationic polycondensation products to be used in accordance with the invention, the noncyclic amine (A1) is prepared preferably by using mono(N,N-dialkylaminoalkyl) amines (A1a) of the general formula I

$$R^1R^2N{-}(CH_2)_n{-}NH_2 \qquad I$$

in which the variables are each defined as follows:
$R^1, R^2$ are each independently $C_1$-$C_6$-alkyl, preferably $C_1$-$C_4$-alkyl, which may be substituted by hydroxyl;
n is from 2 to 6.

Particular preference is given to dialkylaminoalkylamines I which bear the same alkyl radicals on the nitrogen atom. Among these, very particular preference is given in turn to the dimethylaminoalkylamines, in particular dimethylaminopropylamine.

The bifunctional compounds (A1b) used are urea, thiourea, dialkyl carbonates, dicarboxylic acids or diisocyanates.

Suitable dialkyl carbonates (A1b) have especially $C_1$-$C_3$-alkyl radicals, dimethyl carbonate and diethyl carbonate being preferred examples.

The dicarboxylic acids (A1b) may be aliphatic saturated or unsaturated or aromatic dicarboxylic acids and have especially from 2 to 10 carbon atoms.

Examples of suitable dicarboxylic acids are: oxalic acid, malonic acid, succinic acid, tartaric acid, maleic acid, itaconic acid, glutaric acid, adipic acid, suberic acid, sebacic acid, phthalic acid and terephthalic acid.

It will be appreciated that it is also possible to use mixtures of different dicarboxylic acids (A1b).

In addition, the dicarboxylic acids (A1b) may also be used in the form of the free acids or as carboxylic acid derivatives, such as anhydrides, esters, especially di($C_1$-$C_2$-alkyl) esters, amides and acid halides, especially acid chlorides. Examples of suitable acid derivatives include: maleic anhydride, succinic anhydride, itaconic anhydride and phthalic anhydride; dimethyl adipate, diethyl adipate and dimethyl tartrate; adipamide, adipic monoamide and glutaramide; adipoyl chloride.

Preference is given to using the free acids or anhydrides thereof.

Particularly preferred dicarboxylic acids (A1b) are succinic acid, glutaric acid, adipic acid and maleic acid.

Finally, suitable diisocyanates (A1b) are likewise aliphatic, including cyclic aliphatic, and aromatic diisocyanates. The hydrocarbon radicals of the diisocyanates (A1b) have especially from 4 to 12 carbon atoms.

Examples of suitable diisocyanates (A1b) are: tetramethylene diisocyanate, hexamethylene diisocyanate (HDI), trimethylhexamethylene 2,3,3-diisocyanate, dodecamethylene diisocyanate, cyclohexylene 1,4-diisocyanate, dicyclohexylmethane diisocyanate (H12MDI), isophorone diisocyanate (IPDI), 2,2-bis(4-isocyanatocyclohexyl)propane, phenylene 1,4-diisocyanate, tolylene 2,4- and 2,6-diisocyanate (TDI) and isomer mixtures thereof, diphenylmethane 2,4'- and 4,4'-diisocyanate (MDI), o- and m-xylylene diisocyanate (XDI), naphthylene 1,5-diisocyanate, tetramethylxylylene diisocyanate (TMXDI) and the isomers (trans/trans, cis/cis, cis/trans) of bis(4-isocyanatocyclohexyl)methane and mixtures thereof.

It will be appreciated that it is also possible to use mixtures of different diisocyanates (A1b).

Preference is given to the aliphatic and cycloaliphatic diisocyanates (A1b), particular preference being given to hexamethylene diisocyanate and isophorone diisocyanate.

Particularly preferred bifunctional compounds (A1b) are urea, succinic acid, adipic acid, hexamethylene diisocyanate and isophorone diisocyanate.

The molar ratio of dialkylaminoalkylamine (A1a) to bifunctional compound (A1b) is from 1.2:1 to 2.1:1, preferably from 1.5:1 to 2.1:1.

When a molar ratio of (A1a) to (A1b) of less than 2:1 is present, the reaction products formed in the case of use of urea as component (A1b) have a free urea end group and have a regulating action on the molecular weight of the cationic polycondensation products. This allows the molecular weight to be controlled through suitable selection of this molar ratio.

Noncyclic amines (A1) which comprise urea or dicarboxylic acids as the bifunctional component (A1b) may be prepared, for example, by reacting the components (A1a) and (A1b) in bulk at from 120 to 180° C., in which case the water of reaction formed should be removed in the case of the dicarboxylic acids.

Noncyclic amines (A1) which are based on diisocyanates as component (A1b) may, for example, be prepared by initially charging the bifunctional component (A1b) in an organic solvent, for example a carboxylic ester, such as ethyl acetate, at <5° C. and adding the amine (A1a) dropwise.

Instead of the pure noncyclic amines (A1), it is also possible to use mixtures (A2) of the amines (A1) with cyclic amines (A3) to prepare the cationic polycondensation products.

Suitable cyclic amines (A3) are especially imidazole and its alkyl derivatives, piperazine and its alkyl derivatives, pyrazine and pyrimidine. The alkyl derivatives should also be understood to mean derivatives whose alkyl substituents have been functionalized, for example, by amino or hydroxyl groups. Specific examples of piperazine and imidazole derivatives include: 1-, 2- and 4-($C_1$-$C_{25}$-alkyl)imidazoles, in particular 1-, 2- and 4-($C_1$-$C_6$-alkyl)imidazoles, such as 1-methylimidazole, 2-methylimidazole, 2-ethylimidazole, 4-methylimidazole and 1-(3-aminopropyl)imidazole; 2,4-di($C_1$-$C_{25}$-alkyl)imidazoles, in particular 2,4-di($C_1$-$C_6$-alkyl)

imidazoles, such as 2-ethyl-4-methylimidazole; 1-($C_1$-$C_{25}$-alkyl)piperazines, in particular 1-($C_1$-$C_6$-alkyl)piperazines, such as 1-methyl-piperazine; 1,4-di($C_1$-$C_{25}$-alkyl)piperazines, in particular 1,4-di($C_1$-$C_6$-alkyl)piperazines, such as 1,4-dimethylpiperazine, 1,4-bis(3-aminopropyl)piperazine, 1-(2-aminomethyl)-piperazine and 1-(2-hydroxyethyl)piperazine.

It will be appreciated that it is also possible to use mixtures of different cyclic amines (A3).

Preferred cyclic amines (A3) are the imidazoles, particular preference being given to unsubstituted imidazole.

The mixtures (A2) have a molar ratio of noncyclic amine (A1) to cyclic amine (A3) of from 10:1 to 1:10, preferably from 7:1 to 1:7, more preferably from 4:1 to 1:4 and most preferably from 4:1 to 1:2.

The inventive cationic polycondensation products or cationic polycondensation products to be used in accordance with the invention are obtainable by condensation of the noncyclic amine (A1) or of the mixtures (A2) of noncyclic amine (A1) and cyclic amine (A3) with the bifunctional compounds (B).

The bifunctional compounds (B) used are alkylene dihalides, dihaloalkyl ethers, halomethyloxiranes or bisepoxides or mixtures of these compounds.

Suitable alkylene dihalides (B) are in particular the $\omega,\omega'$-dichlorides, -dibromides and -diiodides of unbranched alkanes having from 2 to 8 carbon atoms, preference being given to the bromides and particular preference to the chlorides.

Particularly suitable alkylene dihalides (B) are, for example: 1,2-dichloroethane, 1,2-dibromoethane, 1,3-dichloropropane, 1,4-dichlorobutane, 1,5-dichloropentane and 1,6-dichlorohexane, preference being given to 1,2-dichloroethane, 1,4-dichlorobutane and 1,6-dichlorohexane.

Suitable dihaloalkyl ethers (B) are in particular di($\omega,\omega'$-halo-$C_2$-$C_6$-alkyl)ethers and $\omega$-halo-$C_2$-$C_6$-alkoxy-$C_2$-$C_6$-alkyl $\omega$-halo-$C_2$-$C_6$-alkyl ethers, where halogen may in turn be chlorine, bromine or iodine, preference being given to bromine and particular preference to chlorine. Examples include di(2-chloroethyl)ether and 2-chloroethoxy-ethyl 2-chloroethyl ether.

Suitable halomethyloxiranes (B) have preferably from 3 to 7 carbon atoms, preference being given to the chlorine compounds hereto. A particularly preferred halomethyl-oxirane (B) is epichlorohydrin.

Suitable bisepoxides (B) are in particular bisepoxyalkanes having from 4 to 7 carbon atoms and bisepoxides based on oligomeric and polymeric alkylene glycols, especially $C_2$-$C_3$-alkylene glycols, such as oligo- and polyethylene glycol bisepoxides, oligo- and polypropylene glycol bisepoxides and bisepoxides of EO/PO copolymers. Preferred bisepoxides (B) are bisepoxybutane and oligo- and polyethylene glycol bisepoxides.

Particularly preferred bifunctional compounds (B) are 1,2-dichloroethane, 1,4-dichlorobutane, 1,6-dichlorohexane, di(2-chloroethyl)ether and epichlorohydrin.

The molar ratio of bifunctional compound (B) to amine component (A1) or (A2) is from 0.6:1 to 1.3:1, preferably from 0.8:1 to 1.1:1.

The selection of the molar ratio of (B) to (A1) or (A2) is a further means of controlling the molecular weight of the cationic polycondensation products.

The condensation reaction may likewise be undertaken as is customary for such reactions. A particularly advantageous method has been found to be polycondensation of (B) with (A1) or (A2) in aqueous solution at from 80 to 120° C.

If desired, the cationic polycondensation products which still comprise tertiary amino groups may additionally be reacted with alkylating agents, for example dimethyl sulfate, $C_1$-$C_{22}$-alkyl halides or benzyl chloride, which quaternizes the tertiary amino groups.

The reaction with the alkylating agent may be performed directly in the reaction mixture obtained in the condensation by commonly known methods.

The mean molecular weight $M_w$ of the cationic polycondensation products may be from 500 to 1 000 000. Preference is given to mean molecular weights $M_w$ of from 1000 to 100 000 and more preferably of from 1500 to 50 000.

The cationic polycondensation products are water-soluble or readily water-dispersible and can be used in solid and liquid laundry detergents and in laundry aftertreatment compositions.

They effectively suppress the detachment of dyes from colored textiles during the washing process or during the laundry aftertreatment and thus prevent the colored textiles from becoming paler. Dye transfer to additionally washed fabric and the associated undesired discoloration of these fabrics is also effectively inhibited. Even at concentrations of from 10 to 150 ppm in the wash or rinse liquor, good to very good dye-fixing and dye transfer-inhibiting effects are achieved.

The solid laundry detergent formulations, which are likewise inventive, comprise especially the following components:

(a) from 0.05 to 20% by weight of at least one cationic polycondensation product,
(b) from 0.5 to 40% by weight of at least one nonionic, anionic and/or cationic surfactant,
(c) from 0.5 to 50% by weight of an inorganic builder,
(d) from 0 to 10% by weight of an organic cobuilder and
(e) from 0.1 to 60% by weight of other customary ingredients, such as standardizers, enzymes, perfume, complexing agents, corrosion inhibitors, bleaches, bleach activators, bleach catalysts, further dye protection additives and dye transfer inhibitors, graying inhibitors, soil-release polyesters, fiber protection additives, silicones, dyes, bactericides and preservatives, dissolution improvers, disintegrants and/or water, where the sum of components (a) to (e) adds up to 100% by weight.

The inventive solid laundry detergent formulations may be present in powder, granule, extrudate or tablet form.

The inventive liquid laundry detergent formulations preferably have the following composition:

(a) from 0.05 to 20% by weight of at least one cationic polycondensation product,
(b) from 0.5 to 40% by weight of at least one nonionic, anionic and/or cationic surfactant,
(c) from 0 to 20% by weight of an inorganic builder,
(d) from 0 to 10% by weight of an organic cobuilder and
(e) from 0.1 to 60% by weight of other customary ingredients, such as soda, enzymes, perfume, complexing agents, corrosion inhibitors, bleaches, bleach activators, bleach catalysts, further dye protection additives and dye transfer inhibitors, graying inhibitors, soil-release polyesters, fiber protection additives, silicones, dyes, bactericides and preservatives, organic solvents, solubilizers, hydrotropes, thickeners and/or alkanolamines, and
(f) from 0 to 99.35% by weight of water.

The inventive laundry aftertreatment compositions, especially laundry care rinsing compositions, comprise preferably
(a) from 0.05 to 20% by weight of at least one cationic polycondensation product,
(b) from 0.1 to 40% by weight of at least one cationic surfactant,
(c) from 0 to 30% by weight of at least one nonionic surfactant,
(d) from 0.1 to 30% by weight of other customary ingredients, such as silicones, other lubricants, wetting agents, film-forming polymers, fragrances and dyes, stabilizers, fiber protection additives, further dye protection additives and dye transfer inhibitors, complexing agents, viscosity modifiers, soil-release additives, solubilizers, hydrotropes, corrosion protection additives, bactericides and/or preservatives, and
(e) from 0 to 99.75% by weight of water.

Suitable nonionic surfactants (B) are in particular:

Alkoxylated $C_8$-$C_{22}$-alcohols, such as fatty alcohol alkoxylates, oxo alcohol alkoxylates and Guerbet alcohol ethoxylates: the alkoxylation can be effected with ethylene oxide, propylene oxide and/or butylene oxide. Block copolymers or random copolymers may be present. Per mole of alcohol, they comprise typically from 2 to 50 mol, preferably from 3 to 20 mol, of at least one alkylene oxide. A preferred alkylene oxide is ethylene oxide. The alcohols have preferably from 10 to 18 carbon atoms.

Alkylphenol alkoxylates, especially alkylphenol ethoxylates, which comprise $C_6$-$C_{14}$-alkyl chains and from 5 to 30 mol of alkylene oxide/mol.

Alkylpolyglucosides which comprise $C_8$-$C_{22}$— alkyl chains, preferably $C_{10}$-$C_{18}$-alkyl chains, and generally from 1 to 20, preferably from 1.1 to 5 glucoside units.

N-Alkylglucamides, fatty acid amide alkoxylates, fatty acid alkanolamide alkoxylates, and block copolymers formed from ethylene oxide, propylene oxide and/or butylene oxide.

Suitable anionic surfactants are, for example:

Sulfates of (fatty) alcohols having from 8 to 22, preferably from 10 to 18 carbon atoms, especially $C_9$-$C_{11}$-alcohol sulfates, $C_{12}$-$C_{14}$-alcohol sulfates, $C_{12}$-$C_{18}$-alcohol sulfates, lauryl sulfate, cetyl sulfate, myristyl sulfate, palmityl sulfate, stearyl sulfate and tallow fat alcohol sulfate.

Sulfated alkoxylated $C_8$-$C_{22}$-alcohols (alkyl ether sulfates): compounds of this type are prepared, for example, by first alkoxylating a $C_8$-$C_{22}$— alcohol, preferably a $C_{10}$-$C_{18}$-alcohol, for example a fatty alcohol, and then sulfating the alkoxylation product. For the alkoxylation, preference is given to using ethylene oxide.

Linear $C_8$-$C_{20}$-alkylbenzenesulfonates (LAS), preferably linear $C_9$-$C_{13}$-alkyl-benzenesulfonates and -alkyltoluenesulfonates.

Alkanesulfonates, especially $C_8$-$C_{24}$-alkanesulfonates, preferably $C_{10}$-$C_{18}$-alkane-sulfonates.

Soaps such as the sodium and potassium salts of $C_8$-$C_{24}$-carboxylic acids.

The anionic surfactants are added to the laundry detergent preferably in the form of salts. Suitable salts are, for example, alkali metal salts such as sodium, potassium and lithium salts, and ammonium salts such as hydroxyethylammonium, di(hydroxyethyl)-ammonium and tri(hydroxyethyl)ammonium salts.

Particularly suitable cationic surfactants include:
$C_7$-$C_{25}$-alkylamines;
N,N-dimethyl-N-(hydroxy-$C_7$-$C_{25}$-alkyl)ammonium salts;
mono- and di($C_7$-$C_{25}$-alkyl)dimethylammonium compounds quaternized with alkylating agents;
ester quats, especially quaternary esterified mono-, di- and trialkanolamines which have been esterified with $C_8$-$C_{22}$-carboxylic acids;
imidazoline quats, especially 1-alkylimidazolinium salts of the formulae II or III

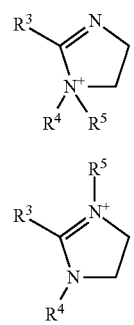

in which the variables are each defined as follows:
$R^3$ is $C_1$-$C_{25}$-alkyl or $C_2$-$C_{25}$-alkenyl;
$R^4$ is $C_1$-$C_4$-alkyl or hydroxy-$C_1$-$C_4$-alkyl;
$R^5$ is $C_1$-$C_4$-alkyl, hydroxy-$C_1$-$C_4$-alkyl or an $R^1$—(CO)—X—$(CH_2)_m$— radical (X: —O— or —NH—; m: 2 or 3),
where at least one $R^3$ radical is $C_7$-$C_{22}$-alkyl.

Suitable amphoteric surfactants are, for example, alkyl betaines, alkylamide betaines, aminopropionates, aminoglycinates and amphoteric imidazolium compounds.

Suitable inorganic builders are in particular:

Crystalline and amorphous aluminosilicates with ion-exchanging properties, in particular zeolites: various types of zeolites are suitable, especially zeolites A, X, B, P, MAP and HS in their Na form or in forms in which Na has been exchanged partly for other cations such as Li, K, Ca, Mg or ammonium.

Crystalline silicates, especially disilicates and sheet silicates, for example δ- and β-$Na_2Si_2O_5$. The silicates may be used in the form of their alkali metal, alkaline earth metal or ammonium salts; preference is given to the sodium, lithium and magnesium silicates.

Amorphous silicates such as sodium metasilicate and amorphous disilicate.

Carbonates and hydrogencarbonates: these may be used in the form of their alkali metal, alkaline earth metal or ammonium salts. Preference is given to the carbonates and hydrogencarbonates of sodium, lithium and magnesium, especially sodium carbonate and/or sodium hydrogencarbonate.

Polyphosphates such as pentasodium triphosphate.

Suitable Organic Cobuilders are in Particular:

Low molecular weight carboxylic acids, such as citric acid, hydrophobically modified citric acid, for example agaric acid, malic acid, tartaric acid, gluconic acid, glutaric acid, succinic acid, imidodisuccinic acid, oxydisuccinic acid, propanetricarboxylic acid, butanetetracarboxylic acid, cyclopentanetetra-carboxylic acid, alkyl- and alkenylsuccinic acids and aminopolycarboxylic acids, for example nitrilotriacetic acid, β-alaninediacetic acid, ethylenediaminetetra-acetic acid, serinediacetic acid, isoserinediacetic acid, N-(2-hydroxyethyl)imino-acetic acid, ethylenediaminedisuccinic acid and methyl- and ethylglycinediacetic acid.

Oligomeric and polymeric carboxylic acids, such as homopolymers of acrylic acid and aspartic acid, oligomaleic acids, copolymers of maleic acid with acrylic acid, methacrylic acid or $C_2$-$C_{22}$-olefins, for example isobutene or long-chain α-olefins, vinyl $C_1$-$C_8$-alkyl ethers, vinyl acetate, vinyl propionate, (meth)acrylic esters of $C_1$-$C_8$-alcohols and styrene. Preference is given to the homopolymers of acrylic acid and copolymers of acrylic acid with maleic acid. The oligomeric and polymeric carboxylic acids are used in acid form or as a sodium salt.

Suitable bleaches are, for example, adducts of hydrogen peroxide to inorganic salts, such as sodium perborate monohydrate, sodium perborate tetrahydrate and sodium carbonate perhydrate, and percarboxylic acids such as phthalimidopercaproic acid.

Suitable bleach activators are, for example, N,N,N',N'-tetraacetylethylenediamine (TAED), sodium p-nonanoyloxybenzenesulfonate and N-methylmorpholinioacetonitrile methylsulfate.

Enzymes used with preference in laundry detergents are proteases, lipases, amylases, cellulases, oxidases and peroxidases.

Suitable further dye transfer inhibitors are, for example, homopolymers, copolymers and graft polymers of 1-vinylpyrrolidone, 1-vinylimidazole or 4-vinylpyridine N-oxide. Homo- and copolymers of 4-vinylpyridine which have been reacted with chloroacetic acid are also suitable as dye transfer inhibitors.

Laundry detergent ingredients are otherwise common knowledge. Detailed descriptions can be found, for example, in WO-A-99/06524 and 99/04313; in Liquid Detergents, Editor: Kuo-Yann Lai, Surfactant Sci. Ser., Vol. 67, Marcel Decker, New York, 1997, p. 272-304.

EXAMPLES

I. Preparation of Inventive Cationic Polycondensation Products

The mean molecular weights $M_w$ specified below were determined by the method of size exclusion chromatography with narrow-distribution pullulan as the calibration standard.

The K values reported were determined according to H. Fikentscher, Cellulose-Chemie, Volume 13, page 58-64 and 761-774 (1932) as a 1% by weight solution in 3% by weight sodium chloride solution at 25° C.

I.a. Preparation of noncyclic amines A1

Amine A1.1

A mixture of 916.6 g (9.0 mol) of N,N-dimethylaminopropylamine and 300.5 g (5.0 mol) of urea was heated with the introduction of nitrogen first to 122° C. within 35 min and then to 155° C. within 4 h, and then stirred at this temperature for a further 12 h.

The amine A1.1 was obtained in the form of a yellowish clear liquid.

Amine A1.2

73.1 g (0.5 mol) of adipic acid were added within 7 min to 122.6 g (1.2 mol) of N,N-dimethylaminopropylamine heated to 60° C., in the course of which the mixture heated to 120° C.

After stirring at 130° C. for 30 minutes, the mixture was heated to 150° C. and the reflux condenser was exchanged for a distillation system. Once the distilling-over of a mixture of water and N,N-dimethylaminopropylamine had stopped, a further 30.7 g (0.3 mol) of N,N-dimethylaminopropylamine were added. Subsequently, the temperature was increased to 160° C. and the mixture was distilled for a further 2 h. Thereafter, the mixture was cooled to 120° C. and distilled at a reduced pressure of 15 mbar for a further 45 min.

The amine A1.2 was obtained in the form of a slightly yellowish solid.

Amine A1.3

The procedure was as described for amine A1.2, except that, instead of adipic acid, 59.0 g (0.5 mol) of succinic acid were used, and a final distillation was effected at a reduced pressure of 38 mbar.

The amine A1.3 was obtained in the form of a slightly yellowish solid.

Amine A1.4

40.9 g (0.4 mol) of N,N-dimethylaminopropylamine were added dropwise to a 10% by weight solution, cooled to 2° C., of 44.5 g (0.2 mol) of isophorone diisocyanate in ethyl acetate within 26 min, in the course of which the temperature rose to 11° C. After about half of the feed, the product began to precipitate out as a white precipitate. After stirring at room temperature for a further 30 min, water was added to completely dissolve the precipitate. The aqueous phase was removed, the organic phase was washed twice with water, then the aqueous phases were combined.

The amine A1.4 was obtained as an aqueous solution comprising small traces of ethyl acetate and having a solids content of 26.8% by weight.

Amine A1.5

The procedure was as described for amine A1.4, except that 33.7 g (0.2 mol) of hexamethylene diisocyanate were used instead of isophorone diisocyanate, and the isolation of the product, after the continued stirring time of 30 minutes, was undertaken as follows:

The white precipitate formed was filtered off and dried at pressure 100 mbar in a nitrogen stream at 70° C. for 23 h.

The amine A1.5 was obtained in the form of a white solid.

I.b. Reaction of Noncyclic Amines (A1) or Mixtures of Cyclic Amines (A1) and Cyclic Amines (A3) with Bifunctional Compounds (B)

Polycondensates 1 to 16

$x_2$ g ($y_2$ mol) of bifunctional compound (B) were added dropwise to an about 38% by weight aqueous solution, heated to 80° C., of $x_1$ g ($y_1$ mol) of the amine (A1) and $x_3$ g ($y_3$ mol) of the amine (A3) within about 8 min. The mixture was stirred at 100° C. for t h and then subjected to a two-hour steam distillation.

In the case of polycondensate 13 and 15, the last residues of ethyl acetate were first removed from the amine A1.4 by distillation.

In the case of polycondensate 14 and 16, the amine A1.5 was first suspended in a concentration of about 45% by weight in water and then heated to 80° C., in the course of which the amine dissolved completely.

Further details of these experiments and solids content and pH of the resulting aqueous polycondensate solutions and K value and mean molecular weight $M_w$ of the polycondensate are compiled in table 1.

TABLE 1

| Polycondensate | $x_1$ [g] $y_1$ [mol] | (A1) | $x_3$ [g] $y_3$ [mol] | (A3) | $x_2$ [g] $y_2$ [mol] | (B) | t [h] | Solids content [% by wt.] | pH | K value | $M_w$ |
|---|---|---|---|---|---|---|---|---|---|---|---|
| 1 | 221.8 0.96 | A1.1 | — | — | 135.9 0.95 | dichlorodiethyl ether | 7 | 54.1 | 8.5 | 19.4 | 39 000 |
| 2 | 221.8 0.96 | A1.1 | — | — | 147.3 0.95 | 1,6-dichlorohexane | 7 | 39.0 | 9.3 | 21.0 | 34 500 |
| 3 | 221.8 0.96 | A1.1 | — | — | 87.9 0.95 | epichlorohydrin | 5 | 49.1 | 9.2 | 15.4 | 8 500 |
| 4 | 65.7 0.21 | A1.2 | — | — | 26.0 0.28 | epichlorohydrin | 5 | 26.7 | 5.6 | 15.1 | |
| 5 | 62.6 0.22 | A1.3 | — | — | 20.4 0.22 | epichlorohydrin | 5 | 38.9 | 8.0 | 12.4 | 3 150 |
| 6 | 62.6 0.22 | A1.3 | — | — | 31.5 0.22 | dichlorodiethyl ether | 19 | 28.3 | 5.7 | 9.9 | |
| 7 | 177.5 0.77 | A1.1 | 13.6 0.20 | imidazole | 135.9 0.95 | dichlorodiethyl ether | 7 | 23.2 | 6.1 | 13.6 | |
| 8 | 110.9 0.48 | A1.1 | 34.0 0.50 | imidazole | 135.9 0.95 | dichlorodiethyl ether | 7 | 33.0 | 5.3 | 15.7 | |
| 9 | 177.5 0.77 | A1.1 | 13.6 0.20 | imidazole | 87.9 0.95 | epichlorohydrin | 5 | 48.9 | 8.7 | 15.3 | 6 800 |
| 10 | 110.9 0.48 | A1.1 | 34.0 0.50 | imidazole | 87.9 0.95 | epichlorohydrin | 5 | 49.0 | 9.3 | 14.0 | 4 950 |
| 11 | 74.83 0.10 | A1.3 | 1.7 0.03 | imidazole | 11.6 0.13 | epichlorohydrin | 5 | 23.5 | 7.5 | 11.6 | 2 850 |
| 12 | 65.0 0.10 | A1.2 | 7.0 0.10 | imidazole | 19.1 0.21 | epichlorohydrin | 5 | 22.5 | 9.6 | 11.8 | |
| 13 | 42.7 0.10 | A1.4 | — | — | 9.3 0.10 | epichlorohydrin | 5 | 37.5 | 10.3 | 15.3 | |
| 14 | 30.0 0.08 | A1.5 | — | — | 7.5 0.08 | epichlorohydrin | 5 | 24.1 | 8.0 | 26.0 | |
| 15 | 34.1 0.08 | A1.4 | 5.5 0.08 | imidazole | 14.8 0.16 | epichlorohydrin | 5 | 18.2 | 9.6 | 12.8 | |
| 16 | 25.0 0.067 | A1.5 | 4.6 0.07 | imidazole | 12.4 0.13 | epichlorohydrin | 5 | 36.4 | 10.2 | 19.6 | |

II.a. Use of Inventive Cationic Polycondensation Products in the Fabric Softening Cycle In order to test the dye-fixing and dye transfer-inhibiting action, the cationic polycondensation products were added to a commercial laundry fabric softener. Selected colored fabric (EMPA 130, EMPA 132, EMPA 133 or EMPA 134) was prewashed in an aqueous solution of the fabric softener at 25° C., spun and then dried. The colored fabric thus pretreated was washed together with white test fabric made of cotton and ballast fabric made of cotton/polyester and of polyester with a laundry detergent at 60° C.

In order to determine the dye transfer-inhibiting action, the staining of the white test fabric after the wash cycle was determined photometrically (photometer: Elrephoe 2000 from Datacolor). From the reflectance values measured on the test fabric, by the method described in A. Kud, Seifen, Öle, Fette, Wachse, Volume 119, page 590-594 (1993), the color strength of the stain was determined. From the color strength from the test with the particular test substance, the color strength for the test without test substance and the color strength of the test fabric before the wash, the dye transfer-inhibiting action of the test substance was determined in % according to the following formula:

$$DTI\ action\ [\%] = \frac{color\ strength\ (without\ polymer) - color\ strength\ (with\ polymer)}{color\ strength\ (without\ polymer) - color\ strength\ (before\ the\ wash)} \times 100$$

To test the color loss of the colored fabric, the treatment with the fabric softener, the subsequent wash and drying was repeated 6 times with the same colored fabric. The white fabric was replaced for each wash cycle. From the color strength of the colored fabric before the 1st wash and the color strength after the 6th wash, the color loss was determined in % according to the following formula:

$$Color\ loss\ [\%] = \frac{color\ strength\ (before\ the\ wash) - color\ strength\ (after\ the\ 6th\ wash)}{color\ strength\ (before\ the\ wash)} \times 100$$

The wash conditions used in the fabric softening cycle and main wash cycle are compiled in table 2.

The composition of laundry detergent is reproduced in table 3.

The test results of the dye transfer inhibition are listed in table 4.

In table 5, the test results of the color fixing are compiled.

TABLE 2

| Fabric softening cycle wash conditions | |
|---|---|
| Appliance | Launder-o-meter from Atlas, Chicago, USA |
| Fabric softener | Lenor ® (Procter & Gamble) |
| Fabric softener dose | 0.5 g/l of liquor |
| Polycondensate dose | 0.05 g/l of liquor |
| Water hardness | 3 mmol/l Ca:Mg 4:1 |
| Liquor ratio | 1:12 |
| Rinse temperature | 25° C. |
| Rinse time | 15 min |
| Colored fabric | 1 g EMPA 130 (C.I. Direct Red 83:1) 1 g EMPA 132 (C.I. Direct Black 22) 1 g EMPA 133 (C.I. Direct Blue 71) 0.5 g EMPA 134 (C.I. Direct Orange 39) (all from Eidgenössische Materialprüfungsanstalt [Swiss Federal Materials Testing Institute], |

TABLE 2-continued

| | |
|---|---|
| | St. Gallen, Switzerland) |
| Test fabric | 10 g of 221 cotton fabric (bleached) |
| Ballast fabric | 5 g of 768 mixed fabric (65:35 polyester:cotton) + 5 g of 854 polyester fabric |
| | Main wash cycle wash conditions |
| Appliance | Launder-o-meter from Atlas, Chicago, USA |
| Laundry detergent dosage | 4.5 g/l of liquor |
| Water hardness | 3 mmol/l Ca:Mg 4:1 |
| Liquor ratio | 1:12 |
| Wash temperature | 60° C. |
| Wash time | 30 min |
| Colored fabric | 1 g EMPA 130 (C.I. Direct Red 83:1) |
| | 1 g EMPA 132 (C.I. Direct Black 22) |
| | 1 g EMPA 133 (C.I. Direct Blue 71) |
| | 0.5 g EMPA 134 (C.I. Direct Orange 39) |
| | (all from Eidgenössische Materialprüfungsanstalt, St. Gallen, Switzerland) |
| Test fabric | 10 g of 221 cotton fabric (bleached) |
| Ballast fabric | 5 g of 768 mixed fabric (65:35 polyester:cotton) + 5 g of 854 polyester fabric |

TABLE 3

Laundry detergent composition

| Ingredients | [% by wt.] |
|---|---|
| Linear alkylbenzenesulfonate | 9 |
| $C_{13}C_{15}$ oxo alcohol × 7 EO | 6 |
| Zeolite A | 45 |
| Sodium carbonate | 7 |
| Magnesium silicate | 0.8 |
| Sodium citrate × 2 $H_2O$ | 12 |
| Acrylic acid/maleic acid copolymer, sodium salt (AA/MA weight ratio 70:30, $M_w$ 70 000) | 5 |
| Soap | 1.8 |
| Water | to 100 |

TABLE 4

| | DTI action [%] | | | |
|---|---|---|---|---|
| | EMPA 130 | EMPA 132 | EMPA 133 | EMPA 134 |
| Polycondensate 1 | 25 | 35 | 23 | 14 |
| Polycondensate 2 | 18 | 43 | 16 | 18 |
| Polycondensate 3 | 7 | 31 | 20 | 14 |
| Polycondensate 4 | 20 | 18 | 14 | 17 |
| Polycondensate 5 | 20 | 20 | 10 | 17 |
| Polycondensate 6 | 22 | 23 | 15 | 16 |
| Polycondensate 7 | 27 | 36 | 14 | 18 |
| Polycondensate 8 | 23 | 31 | 15 | 11 |
| Polycondensate 9 | 20 | 20 | 20 | 22 |
| Polycondensate 10 | 45 | 28 | 18 | 24 |
| Polycondensate 11 | 25 | 34 | 18 | 19 |
| Polycondensate 12 | 26 | 35 | 24 | 17 |
| Polycondensate 15 | 32 | 11 | 5 | 6 |
| Polycondensate 16 | 28 | 24 | 10 | 8 |

TABLE 5

| | Color loss [%] | | | |
|---|---|---|---|---|
| | EMPA 130 | EMPA 132 | EMPA 133 | EMPA 134 |
| None | 42 | 27 | 51 | 41 |
| Polycondensate 1 | 32 | 11 | 38 | 35 |
| Polycondensate 2 | 38 | 14 | 51 | 40 |
| Polycondensate 3 | 33 | 18 | 37 | 37 |

TABLE 5-continued

| | Color loss [%] | | | |
|---|---|---|---|---|
| | EMPA 130 | EMPA 132 | EMPA 133 | EMPA 134 |
| Polycondensate 4 | 39 | 13 | 44 | 37 |
| Polycondensate 5 | 34 | 18 | 39 | 36 |
| Polycondensate 6 | 39 | 16 | 49 | 35 |
| Polycondensate 7 | 29 | 18 | 48 | 35 |
| Polycondensate 8 | 25 | 14 | 48 | 35 |
| Polycondensate 9 | 25 | 26 | 35 | 32 |
| Polycondensate 10 | 18 | 20 | 33 | 30 |
| Polycondensate 11 | 26 | 19 | 42 | 36 |
| Polycondensate 12 | 21 | 21 | 43 | 36 |
| Polycondensate 15 | 24 | 20 | 46 | 37 |
| Polycondensate 16 | 25 | 19 | 46 | 36 |

II.b. Use of Inventive Cationic Polycondensation Products in the Main Wash Cycle Selected colored fabric (EMPA 130, EMPA 132, EMPA 133 or EMPA 134) was washed 8 times in succession in the presence of white test fabric made of cotton and ballast fabric made of cotton/polyester and of polyester with a laundry detergent at 60° C. with addition of the cationic polycondensation products. The white test fabric was replaced after each wash cycle. To determine the dye transfer-inhibiting action of the polycondensates, the staining of the white test fabric after the 1st wash was quantified by means of color strength determination according to the abovementioned formula for calculating the DTI action. From the color strength of the test fabric before the 1st wash and the color strength after the 8th wash, the color loss was determined by the following modified formula to calculate the color loss:

$$\text{Color loss } [\%] = \frac{\text{color strength (before the wash)} - \text{color strength (after the 8th wash)}}{\text{color strength (before the wash)}} \times 100$$

The wash conditions correspond to the conditions specified for the main wash cycle in table 1, except that 0.10 g of polycondensate/l of liquor was additionally used.

The same laundry detergent as under II.a. was used (for composition see table 3).

The test results of the dye transfer inhibition are listed in table 6.

In table 7, the test results of the dye fixing are compiled.

TABLE 6

| | DTI action [%] | | |
|---|---|---|---|
| | EMPA 130 | EMPA 132 | EMPA 134 |
| Polycondensate 1 | | 32 | 9 |
| Polycondensate 2 | | 31 | 11 |
| Polycondensate 7 | 35 | 26 | |
| Polycondensate 8 | 33 | 28 | |
| Polycondensate 10 | 81 | 42 | |
| Polycondensate 12 | 50 | 36 | |

TABLE 7

| | Color loss [%] | | |
|---|---|---|---|
| | EMPA 130 | EMPA 132 | EMPA 134 |
| None | | 29 | 46 |
| Polycondensate 1 | | 23 | 45 |

TABLE 7-continued

| | Color loss [%] | | |
| --- | --- | --- | --- |
| | EMPA 130 | EMPA 132 | EMPA 134 |
| Polycondensate 2 | | 23 | 46 |
| None | 47 | 35 | |
| Polycondensate 7 | 36 | 29 | |
| Polycondensate 8 | 40 | 29 | |
| Polycondensate 10 | 21 | 28 | |
| Polycondensate 12 | 25 | 25 | |

The invention claimed is:

1. A cationic polycondensation product obtained by condensation of
   (A2) at least one mixture of
      (A1) at least one noncyclic amine prepared by reaction of
         (A1a) at least one mono(N,N-dialkylaminoalkyl) amine
         with
         (A1b) at least one bifunctional compound selected from the group consisting of urea, thiourea, a dialkyl carbonate, an aliphatic and aromatic dicarboxylic acid, and an aliphatic and aromatic diisocyanate, in a molar ratio from 1.2:1 to 2.1:1,
      and
      (A3) at least one cyclic amine,
      in a molar ratio from 10:1 to 1:10
   with
   (B) at least one bifunctional compound selected from the group consisting of an alkylene dihalide, dihaloalkyl ether, halomethyloxirane, and a bisepoxide,
   in a molar ratio (B) to (A2) from 0.6:1 to 1.3:1.

2. The cationic polycondensation product according to claim 1, wherein the component (A3) is at least one cyclic amine selected from the group consisting of imidazole, an alkyl derivative of imidazole, piperazine, an alkyl derivative of piperazine, pyrazine and pyrimidine.

3. A laundry detergent comprising the cationic polycondensation product according to claim 1 as a dye-fixing and/or dye transfer-inhibiting additive.

4. A solid laundry detergent formulation comprising
   (a) from 0.05 to 20% by weight of at least one cationic polycondensation product according to claim 1,
   (b) from 0.5 to 40% by weight of at least one nonionic, anionic and cationic surfactant,
   (c) from 0.5 to 50% by weight of at least one inorganic builder,
   (d) from 0 to 10% by weight of at least one organic cobuilder and
   (e) from 0.1 to 60% by weight of at least one customary ingredient selected from the group consisting of a standardizer, enzyme, perfume, complexing agent, corrosion inhibitor, bleache, bleach activator, bleach catalyst, further dye protection additive and dye transfer inhibitor, graying inhibitor, soil-release polyester, fiber protection additive, silicone, dye, bactericide and preservative, dissolution improver, disintegrant, and water,
wherein the sum of the components (a) to (e) adds up to 100% by weight.

5. A liquid laundry detergent formulation comprising
   (a) from 0.05 to 20% by weight of at least one cationic polycondensation product according to claim 1,
   (b) from 0.5 to 40% by weight of at least one nonionic, anionic and cationic surfactant,
   (c) from 0 to 20% by weight of at least one inorganic builder,
   (d) from 0 to 10% by weight of at least one organic cobuilder and
   (e) from 0.1 to 60% by weight of at least one customary ingredient selected from the group consisting of soda, an enzyme, perfume, a complexing agent, corrosion inhibitor, bleach, bleach activator, bleach catalyst, further dye protection additive and a dye transfer inhibitor, graying inhibitor, soil-release polyester, fiber protection additive, silicone, dye, bactericide and preservative, organic solvent, solubilizer, hydrotrope, thickener, and an alkanolamine, and
   (f) from 0 to 99.35% by weight of water.

6. A laundry aftertreatment composition comprising the cationic polycondensation product according to claim 1 as a dye-fixing and/or dye transfer-inhibiting additive.

7. A laundry aftertreatment composition comprising
   (a) from 0.05 to 20% by weight of at least one cationic polycondensation product according to claim 1,
   (b) from 0.1 to 40% by weight of at least one cationic surfactant,
   (c) from 0 to 30% by weight of at least one nonionic surfactant,
   (d) from 0.1 to 30% by weight of at least one customary ingredient selected from the group consisting of silicone, another lubricant, a wetting agent, film-forming polymer, fragrance and dye, stabilizer, fiber protection additive, further dye protection additive and dye transfer inhibitor, complexing agent, viscosity modifier, soil-release additive, solubilizer, hydrotrope, corrosion protection additive, bactericide, and a preservative, and
   (e) from 0 to 99.75% by weight of water.

8. A cationic polycondensation product obtained by condensation of
   (A2) at least one mixture of
      (A1) at least one noncyclic amine prepared by reaction of
         (A1a) at least one mono(N,N-dialkylaminoalkyl) amine
         with
         (A1b) at least one bifunctional compound selected from the group consisting of an aliphatic and aromatic dicarboxylic acid, and an aliphatic and aromatic diisocyanate,
         in a molar ratio from 1.2:1 to 2.1:1,
      and
      (A3) at least one cyclic amine,
      in a molar ratio of 10:1 to 1:10
   with
   (B) at least one bifunctional compound selected from the group consisting of an alkylene dihalide, dihaloalkyl ether, halomethyloxirane, and a bisepoxide, in a molar ratio of (B) to (A2) of 0.6:1 to 1.3:1.

9. A laundry detergent comprising the cationic polycondensation product according to claim 8 as a dye-fixing and/or dye transfer-inhibiting additive.

10. A solid liquid laundry detergent formulation comprising
   (a) from 0.05 to 20% by weight of at least one cationic polycondensation product according to claim 9,
   (b) from 0.5 to 40% by weight of at least one nonionic, anionic and cationic surfactant,
   (c) from 0.5 to 50% by weight of at least one inorganic builder,
   (d) from 0 to 10% by weight of at least one organic cobuilder, and (e) from 0.1 to 60% by weight of at least one customary ingredient selected from the group consisting of a standardizer, enzymes, perfume, complexing agent, corrosion inhibitor, bleach, bleach activator, bleach catalyst, further dye protection additive and dye transfer inhibitor, graying inhibitor, soil-release polyester, fiber protection additive, silicones, dye, bactericide and preservative, dissolution improver, disintegrant, and water, wherein the sum of components (a) to (e) adds up to 100% by weight.

11. A liquid laundry detergent formulation comprising
(a) from 0.05 to 20% by weight the cationic polycondensation product according to claim 8,
(b) from 0.5 to 40% by weight of at least one nonionic, anionic and cationic surfactant,
(c) from 0 to 20% by weight of at least one inorganic builder,
(d) from 0 to 10% by weight of at least one organic cobuilder, and
(e) from 0.1 to 60% by weight of at least one customary ingredient selected from the group consisting of soda, an enzyme, perfume, a complexing agent, corrosion inhibitor, bleache, bleach activator, bleach catalyst, further dye protection additive and dye transfer inhibitor, graying inhibitor, soil-release polyester, fiber protection additive, silicones, dye, bactericide and preservative, organic solvent, solubilizer, hydrotrope, thickener, and an alkanolamine, and
(f) from 0 to 99.35% by weight of water.

12. A laundry aftertreatment composition comprising the cationic polycondensation product according to claim 8 as a dye-fixing and/or dye transfer-inhibiting additive.

13. A laundry aftertreatment composition comprising
(a) from 0.05 to 20% by weight of at least one cationic polycondensation product according to claim 8,
(b) from 0.1 to 40% by weight of at least one cationic surfactant,
(c) from 0 to 30% by weight of at least one nonionic surfactant,
(d) from 0.1 to 30% by weight of at least one customary ingredient selected from the group consisting of silicone, another lubricant, a wetting agent, film-forming polymer, fragrances and dye, stabilizer, fiber protection additive, further dye protection additive and dye transfer inhibitor, complexing agent, viscosity modifier, soil-release additive, solubilizer, hydrotrope, corrosion protection additive, bactericide, and a preservative, and
(e) from 0 to 99.75% by weight of water.

* * * * *